United States Patent [19]

Wilke et al.

[11] Patent Number: 4,788,087

[45] Date of Patent: Nov. 29, 1988

[54] TUBULAR CASINGS

[75] Inventors: Michaela Wilke, Schneverdingen; Hartmut Klusik, Fallingbostel; Klaus Balser, Walsrode, all of Fed. Rep. of Germany

[73] Assignee: Wolff Walsrode Aktiengesellschaft, Walsrode, Fed. Rep. of Germany

[21] Appl. No.: 55,205

[22] Filed: May 28, 1987

[30] Foreign Application Priority Data

Jun. 14, 1986 [DE] Fed. Rep. of Germany ....... 3620165

[51] Int. Cl.$^4$ .................. F16L 11/00; A22C 13/00; 428 36; 428 508; 428 479.3
[52] U.S. Cl. ................................ 428/34.8; 138/118.1; 426/105; 426/135; 428/479.3; 428/508
[58] Field of Search .............................. 426/105, 135; 138/118.1

[56] References Cited

U.S. PATENT DOCUMENTS

| | | | |
|---|---|---|---|
| 3,617,312 | 11/1971 | Rose | 138/118.1 |
| 4,142,013 | 2/1979 | Hammer et al. | 138/118.1 |
| 4,543,282 | 9/1985 | Hammer et al. | 138/118.1 |
| 4,563,376 | 1/1986 | Hammer et al. | 138/118.1 |
| 4,666,750 | 5/1987 | Hammer et al. | 138/118.1 |
| 4,670,273 | 6/1987 | Hammer et al. | 138/118.1 |

Primary Examiner—John E. Kittle
Assistant Examiner—James J. Seidleck
Attorney, Agent, or Firm—Sprung Horn Kramer & Woods

[57] ABSTRACT

Tubular packaging casing, in particular a food-stuffs casing of regenerated cellulose, which contains an internal coating of film-forming plastic resins, which contains 10 to 200 mg of a protein coagulant per m$^2$ of internal coating having at least one COOH-group or a salt thereof.

7 Claims, No Drawings

TUBULAR CASINGS

BACKGROUND OF THE INVENTION

1. Field of the Invention

The invention relates to tubular casings, preferably foodstuffs casings of regenerated cellulose, which have improved adhesion to their filling.

2. Background Information

Tubular casings of regenerated cellulose are widely used as packaging materials for foodstuffs and are thus employed on a very large scale for the manufacture of processed meat products such as sausage products. If the inside of such foodstuffs casings is used untreated, it is observed that, during sausage production, in particular the production of uncooked sausages, the sausage meat does not adhere sufficiently firmly to the sausage casing. Consequently, there is partial detachment from the sausage casing in the sausage, frequently together with an undesired formation of an oil or jelly film on the sausage material.

Moreover, because of the detaching, the foodstuffs casing no longer shrinks with the filling material, so that the sausage has a creased and unattractive appearance.

In order to overcome the disadvantages mentioned, it is usual to provide the inside of the tubular foodstuffs casing of regenerated cellulose with a coating based on chemically modified proteins, epichlorohydrin resins, polyamine-polyamide resins, urea/formaldehyde or melamine/formaldehyde resins. (U.S. Pat. No. 3 378 379 and EP-A-88308).

Admittedly, this internal finish to tubular foodstuffs casings leads to an improvement in adhesion, but this is insufficient for some applications including the production of uncooked sausages. In addition, it is observed that tubular casings internally coated in this way can strick, so that opening and filling can be greatly impeded. German Gebrauchsmuster G No. 8 436 989 teaches the addition of a lactone to an internal finish but only for preventing discolouration.

SUMMARY OF THE INVENTION

It was therefore the object of the present invention to provide a tubular packaging casing, preferably a tubular foodstuffs casing of regenerated cellulose, which shows excellent adhesion to the material filled in, due to its special internal coating and can be processed without problems.

This is achieved with the tubular packaging casings according to the invention, in particular foodstuffs casings in particular of regenerated cellulose, which are distinguished in that they have an internal coating of film-forming plastic resins, which contain 10 to 200 mg per m$^2$ of a preferably water-soluble protein coagulant having at least one COOH-group or a salt therefore of internal coating, preferably 20 to 80 mg/m$^2$.

DETAILED DESCRIPTION OF THE INVENTION

Both the film-forming polymer and the protein coagulant are selected in accordance with their toxicological acceptability. Therefore, the film-forming polymers used are preferably protein-like chemical compounds which have already been used for the internal coating of sausage casings, such as chemically modified proteins, cationic polymers such as, for example, epichlorhydrin and polyamine-polyamide resins, (polyaminoamide resins), polyethyleneimine resisn, urea/formaldehyde or melamine/formaldehyde resins. Preferably, polyaminoamide or polyethyleneimine resins are employed. They should be applied in conventional amounts, from aqueous solutions containing 0.5–5, preferably 1 to 3 % by weight of resin.

As coagulants, monomolecular organic, preferably aliphatic, optionally unsaturated mono- or poly-carboxylic acids are preferably suitable, which can contain further functional groups, preferably OH groups, or salts, preferably alkali metal salts. As examples of such compounds, tartaric acid, citric acid, ascorbic acid, tetrahydroxyadipic acid and sorbic acid may be mentioned.

Surprisingly, the tubular foodstuffs casings provided with the internal finish according to the invention show better adhesion of sausage meat. The preparation of tubular packaging casings of regenerated cellulose, which can optionally be fibre-reinforced and optionally coated on the outside in a known manner, by extrusion or spinning is generally known. In this case, the optionally fibre-reinforced tubing is coagulated, regenerated, washed, plasticized and then dried. The internal finishing, according to the invention, of the tubular casing can be preferably carried out during the manufacturing process, of the casing of regenerated cellulose or after drying. An aqueous solution, preferably a 0.5 to 5 % strength by weight, in particular 1 to 3 % strength by weight, aqueous solution, of the film-forming polymer, which additionally contains the water-soluble protein coagulant in quantities of 0.5 to 5, preferably 1 to 3 % by weight, is then filled into the tubular casing in the usual way. During the continuous production of the tubular casing, the internal filling runs along, wets the inner surface of the tubular casing and is firmly anchored to the latter in the usual way by subsequent drying of the casing.

It is then found that the tubular casing finished according to the invention not only shows excellent adhesion to the sausage meat but that also the further processing of the internally coated casing, for example the opening and filling, can be carried out without difficulty. In addition, the adhesion shows no fluctuations, which otherwise occur in the case of the known internal coatings due to exhaustion of the impregnation solution, since the uniform quality of the coating solution can be controlled during the internal coating by measurement of the pH value and comparison with the originally set pH of the impregnation solution.

The internal finish according to the present invention can be used for casings with or without a fibrous reinforcement which may have an external coating and may be coloured. The finish is of particular interest for casings made of regenerated cellulose but may be applied for other materials, too.

EXAMPLES

The tubular packaging casings provided for the additional internal finish had been produced as follows:

A web of hemp paper was formed by the usual process into a tube and coated from one side or both sides with cellulose xanthate solution, regenerated, plasticized and dried.

The treatment solution was applied to the inner surface either before or after drying.

The sample sausages with uncooked sausage meat or boiled sausage meat as the filling were prepared by usual processes. Before the filling step, the sausage casings were steeped in water as required.

PEI=polyetheneimine
PAA=polyamino-amide

All the data relate to % by weight in aqueous solution.

EXAMPLE 1

In continuous production, a smoke-coloured fibrous casing, coated with viscose on one side, of calibre 65 was filled in the wet state with 3 litres of aqueous coating solution containing 1 % by weight of ascorbic acid and 1 % by weight of PEI resin, and the inner surface was finished with this solution over a section of 500 m length.

The pH of the coating solution was 4.10. The amount of ascorbic acid applied per unit area after processing 500 m is 16 mg/m² of internal coating.

The casings internally finished with the mixture indicated above were filled by the usual procedure with uncooked sausage meat and with boiled sausage meat and peeled after having been stored as required by the process:

Results:
(a) Filled with uncooked sausage meat
After the maturing time of the sausage, the casing had not become detached, showed strong adhesion to the sausage meat on peeling and showed no oil separation whatsoever.

(b) Filled with boiled sausage meat
The casing was peeled off after one day, and it showed strong adhesion of the sausage meat with a covering of sausage meat over the full area. No deposition of the jelly was detectable.

EXAMPLE 2

An about 1.50 m long section of a fibrous casing of natural colour, of calibre 55, coated with viscose on one side, was treated on the inside in the dry state with an aqueous solution containing 3 % by weight of ascorbic acid and 1% by weight of PAA resin.

The casings thus treated were filled with boiled sausage meat by the usual process and peeled on the next day. The casing showed strong adhesion to the sausage meat and no jelly deposition whatsoever.

EXAMPLE 3

An about 1.50 m long section of the fibrous casing described in Example 2 was finished in the dry state on the inner surface with an aqueous coating solution containing 0.5 % by weight of sorbic acid and 1 % by weight of PEI resin.

Using the casings thus internally finished, uncooked sausages were produced by the usual manfacturing process and peeled after having been stored as required for maturing.

The casing had not become detached from the filling and showed very good adhesion to the sausage meat on peeling. No oil deposition was detectable.

EXAMPLE 4

The fibrous casing indicated in Example 2 was coated in a section of about 1.50 m length in the dry state with an aqueous coating solution containing 1 % by weight of citric acid and 1 % by weight of PAA resin.

The packaging casings treated on the inner surface were used for producing boiled sausages and peeled off after one day. The casings showed strong adhesion to the filling, with a covering of sausage meat over the full area on the inside of the peeled-off casing.

EXAMPLE 5

In continuous production, a fibrous casing of natural colour, of calibre 58, coated with viscose on one side was coated in the wet state over a section of about 1,200 m on the inner surface with an aqueous solution containing 1.5 % by weight of citric acid and 1 % by weight of PEI resin (pH: 2.83).

Samples were taken every 100 m and these were filled with uncooked sausage meat. After having been stored as required for maturing, the casing was peeled off. In no case was there an oil separation on the sausage cylinder. All the samples showed strong adhesion between the casing and the filling.

EXAMPLE 6

In continuous production, a white-coloured fibrous casing of calibre 59, coated with viscose on both sides, was coated in the wet state on the inner surface over a length of about 1,100 m with a coating solution containing 1.5 % by weight of citric acid and 1 % by weight of PEI resin (pH: 3.05).

A sample was taken every 100 m, and filling with uncooked sausage meat was carried out. After having been stored as required for maturing, the sausage casings were peeled off. None of the samples showed a separation of oil. All the casings adhered strongly to the filling during the peeling step. Grey spottiness of the casing was not detectable in any of the samples.

EXAMPLE 7

A cream-coloured fibrous casing of calibre 60, coated with viscose on both sides and with a lacquer on the outside, was coated on the inside of a section of about 1.50 m length in the dry state with an aqueous solution containing 3 % by weight of citric acid and 2 % by weight of PEI resin.

The casings were filled with boiled sausage meat and peeled off after 10 days. During the peeling step, the sausages showed good adhesion between the casing and filling and no jelly separation on the sausage cylinder.

COMPARISON EXAMPLE 1

A cream-coloured fibrous casing of calibre 60, coated with viscose on one side and with a lacquer on the outside, was coated on the inside of a section of about 1.50 m length in the dry state with a coating solution containing 3 % by weight of a polyethyleneimine resin.

The casings were filled with boiled sausage meat and peeled off after 10 days. A jelly separation was found; moreover, the adhesion of the casing to the filling was found to be inadequate.

COMPARISON EXAMPLE 2

An about 1.50 m long section of a fibrous casing of calibre 55, of natural colour and coated with viscose on one side, was treated on the inside in the dry state with the following solution:

1 % strength aqueous solution of a polyethyleneimine resin.

The casing was filled with boiled sausage meat and peeled after one day. The casing did not show adequate adhesion to the filling.

We claim:
1. A regenerated cellulose tubular packaging casing having an internal coating of a film-forming plastic resin, which contains 10 to 200 mg of a coagulant, the coagulant capable of coagulating proteins, the coagulant having at least one carboxyl-group or a salt thereof per m² of said internal coating.

2. A packaging casing according to claim 1, wherein the internal coating contains 20–80 mg of said coagulant per m² of internal coating.

3. A packaging casing according to claim 1, wherein the coagulant is at least one monomolecular, organic mono- or polycarboxylic acid, which can contain further functional groups or a salt thereof.

4. A packaging casing according to claim 1, wherein the coagulant is selected from the group consisting of tartaric acid, citric acid, ascorbic acid, tetrahydroxyadipic acid and sorbic acid.

5. A packaging casing according to claim 1, wherein the resin is selected from the group consisting of epichlorohydrin resins, polyamine-polyamide resins, polyethyleneimine resins, urea/formaldehyde resins and melamine/formaldehyde resins.

6. A packaging casing according to claim 1, wherein the resin is applied in an aqueous solution containing 0.5 to 5% by weight of the resin.

7. A packaging casing according to claim 1, wherein the resin is applied in an aqueous solution containing 1 to 3% by weight of the resin.

* * * * *